(12) United States Patent
Kobayashi

(10) Patent No.: US 7,215,053 B2
(45) Date of Patent: May 8, 2007

(54) MOTOR

(75) Inventor: Kazutaka Kobayashi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 11/157,713

(22) Filed: Jun. 20, 2005

(65) Prior Publication Data

US 2005/0285473 A1    Dec. 29, 2005

(30) Foreign Application Priority Data

Jun. 25, 2004   (JP)   ............................. 2004-187626
Oct. 28, 2004   (JP)   ............................. 2004-314148

(51) Int. Cl.
*H02K 5/00*   (2006.01)

(52) U.S. Cl. ...................................... 310/89; 310/49 R

(58) Field of Classification Search .............. 310/49 R, 310/89–90
See application file for complete search history.

(56) References Cited

U.S. PATENT DOCUMENTS 5,264,747 A * 11/1993 Kawamura ................ 310/49 R
6,836,034 B2 * 12/2004 Hsu et al. .................. 310/49 R

FOREIGN PATENT DOCUMENTS

JP      09-135562      5/1997

* cited by examiner

*Primary Examiner*—Thanh Lam
(74) *Attorney, Agent, or Firm*—Reed Smith LLP

(57) ABSTRACT

A motor includes a rotor part having a rotor shaft and a rotor magnet, a stator part oppositely disposed to the rotor magnet via a gap space, a bearing rotatably supporting the rotor shaft, a spring member abutting with one end of the rotor shaft to urge the rotor shaft in an axial direction. A spring member side restricting part is provided in the spring member to prevent fluctuation in the radial direction of the rotor shaft and a rotor shaft side restricted part is provided in the rotor shaft and engages with the spring member side restricting part.

3 Claims, 6 Drawing Sheets

MOTOR

CROSS-REFERENCE TO RELATED APPLICATIONS

This application claims priority to Japanese Application No. 2004-187626 filed Jun. 25, 2004 and Japanese Application No. 2004-314148 filed Oct. 28, 2004, which are incorporated herein by reference.

FIELD OF THE INVENTION

The present invention relates to a motor in which one end of a rotor shaft is urged by a spring member in its axial direction.

BACKGROUND OF THE INVENTION

A conventional motor 100 includes a rotor part 101 having a rotor shaft 103 and a rotor magnet 104 and a stator part 102 which is disposed so as to face the rotor magnet 104 through a clearance as shown in FIG. 5. The rotor shaft 103 is rotatably supported by bearings 105, 110 and one end of the rotor shaft 103 is urged by a plate spring 107 in an axial direction through a ball 108.

The bearing 105 includes a ball 105a abutting with a fitting hole which is formed on the other end of the rotor shaft 103 and a ball holding body 105b for holding the ball 105a. The bearing 110 is a radial bearing for supporting the rotor shaft 103 in a radial direction and is disposed on the under side of the rotor magnet 104 in FIG. 5. A clearance is formed between the inner peripheral face of the bearing 110 and the outer peripheral face of the rotor shaft 101, and thus the rotor shaft 101 rotates smoothly without being locked (see Japanese Patent Laid-Open No. Hei 9-135562).

However, in the motor 100 shown in FIG. 5, the fluctuation occurs in the rotor shaft 101 due to the positioning errors or the like between the rotor magnet 104 and the stator part 102 when the motor is rotated, and noises are generated between the bearings 110, 105 or the like and the rotor shaft 103. It has been known that these noises are two different types of noise, i.e., striking noise and sliding noise.

The striking noise has been considered to be generated by the rotor shaft 101 that moves radially due to the clearance formed between the inner peripheral face of the bearing 110 and the outer peripheral face of the rotor shaft 103 and the rotor shaft 103 that strikes against the inner peripheral face of the bearing 110. When the rotor shaft 103 strikes the bearing 110, a rattling sound is generated. This indicates the generation of the striking noise. The sliding noise is considered to be generated when the ball 105a integrally rotated with the rotor shaft 103 slides to the ball holding body 105b and when the ball 108 integrally rotated with the rotor shaft 103 slides to the plate spring 107. Further, the sliding noise is considered to be generated between the rotor shaft 103 and the bearing 110 when the rotor shaft 103 is rotated.

SUMMARY OF THE INVENTION

It has been found that the occurrence of the striking noise can be restrained by regulating and preventing the fluctuation of the rotor shaft in the radial direction. Although the sliding noise may increase a little, overall the noises are reduced during the rotation of the motor more than before. Therefore, it is an object and advantage of the present invention to provide a motor which is capable of restraining the occurrence of the striking noise by regulating and preventing the fluctuation of the rotor shaft in the radial direction.

In order to achieve the above object and advantage, according to an embodiment of the present invention, there is provided a motor including a rotor part having a rotor shaft and a rotor magnet, a stator part which is oppositely disposed to the rotor magnet via a gap space, a bearing which rotatably supports the rotor shaft, a spring member which abuts with one end of the rotor shaft to urge the rotor shaft in an axial direction, a spring member side restricting part which is provided in the spring member to prevent the fluctuation in the radial direction of the rotor shaft, and a rotor shaft side restricted part which is provided in the rotor shaft and engages with the spring member side restricting part.

In accordance with an embodiment of the present invention, a spring member side restricting part is provided in the spring member to prevent the fluctuation in the radial direction of the rotor shaft and a rotor shaft side restricted part that engages with the spring member side restricting part is provided in the rotor shaft. Therefore, even when the rotor shaft is fluctuated in the radial direction, the fluctuation in the radial direction of the rotor shaft is regulated by both the spring member side restricting part and the rotor shaft side restricted part, and thus the vibration can be restrained and the occurrence of the striking noise can be restrained.

In accordance with an embodiment of the present invention, a spherical recessed part is formed in one of the rotor shaft side restricted part and the spring member side restricting part, and a spherical protruded part is formed in the other rotor shaft side restricted part and the spring member side restricting part. For example, the spring member side restricting part may be formed with the spherical recessed part and the rotor shaft side restricted part may be formed with the spherical protruded part. In this case, the diameter of the spherical recessed part of the spring member side restricting part is preferably set to be larger than the diameter of the spherical protruded part of the rotor shaft side restricted part. According to the construction described above, a type of aligning function can be obtained in which their respective axial centers are shifted so as to coincide with each other. As a result, the fluctuation of the rotor shaft can be converged in the restraining direction by using the rotor shaft side restricted part and the spring member side restricting part, and thus the vibration can be securely restrained and the occurrence of the striking noise can be restrained. In addition, the rotor shaft side restricted part is easily worked to the spherical protruded part and the spherical recessed part is easily formed in the spring member side restricting part. Therefore, additional component parts are not needed, and the rotor shaft side restricted part and the spring member side restricting part can be simply worked without requiring a special tool and can be formed at a low cost.

Further, in accordance with an embodiment of the present invention, the spring member preferably urges the rotor shaft in the radial direction. In order to obtain this construction, the spring member side restricting part may abut with the rotor shaft side restricted part at a position deviated from the shaft center line of the rotor shaft. Concretely, the spring member side restricting part preferably abuts with the rotor shaft side restricted part at a position deviated about angle $\theta=20°$ in the radial direction from the shaft center line of the rotor shaft. Since the rotor shaft is urged by the spring member in the radial direction, the fluctuation of the rotor shaft is regulated along the direction contacting with the spring member, and thus its vibration is restrained and the occurrence of the striking noise can be restrained.

Further, in accordance with an embodiment of the present invention, the spring member side restricting part urges the rotor shaft side restricted part in the axial direction of the rotor shaft. Concretely, the rotor shaft side restricted part may be formed in a spherical shape and the abutting part of the spring member side restricting part with the rotor shaft side restricted part may be formed in a V-shaped part, a spherical recessed part, an aperture part or a circular ring member. Alternatively, the rotor shaft side restricted part may be formed in a spherical recessed part and the spring member side restricting part may be formed in a spherical protruded part. According to the construction described above, the fluctuation of the rotor shaft is regulated by the spring member side restricting part and the rotor shaft side restricted part, and thus its vibration is restrained and the occurrence of the striking noise can be restrained. In addition, when the rotor shaft side restricted part is urged by the spring member side restricting part in the axial direction of the rotor shaft, the spring member side restricting part may abut with the rotor shaft (rotation side controlling part) at the position of or near the rotational center line of the rotor shaft. Therefore, the starting torque required to start the motor at stopping can be reduced and the starting performance of the motor can be improved.

Further, in accordance with an embodiment of the present invention, the spring member is preferably provided with a bent part for adjusting a position where the spring member side restricting part abuts with the rotor shaft side restricted part. When the spring member is provided with the bent part which is formed by bending a spring part, the position of the spring member side restricting part abutting with the rotor shaft can be adjusted if necessary. The bent part can be easily formed at a low cost.

As described above, the motor in accordance with the embodiment of the present invention includes a rotor part having a rotor shaft and a rotor magnet, a stator part which is oppositely disposed to the rotor magnet via a gap space, a bearing which rotatably supports the rotor shaft, a spring member which abuts with one end of the rotor shaft to urge the rotor shaft in an axial direction, a spring member side restricting part which is provided in the spring member to prevent the fluctuation in the radial direction of the rotor shaft, and a rotor shaft side restricted part which is provided in the rotor shaft and engages with the spring member side restricting part. Therefore, even when the rotor shaft is fluctuated in the radial direction, the fluctuation in the radial direction of the rotor shaft is regulated by both the spring member side restricting part and the rotor shaft side restricted part, and thus the vibration can be restrained and the occurrence of the striking noise can be restrained.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

Figure 1:
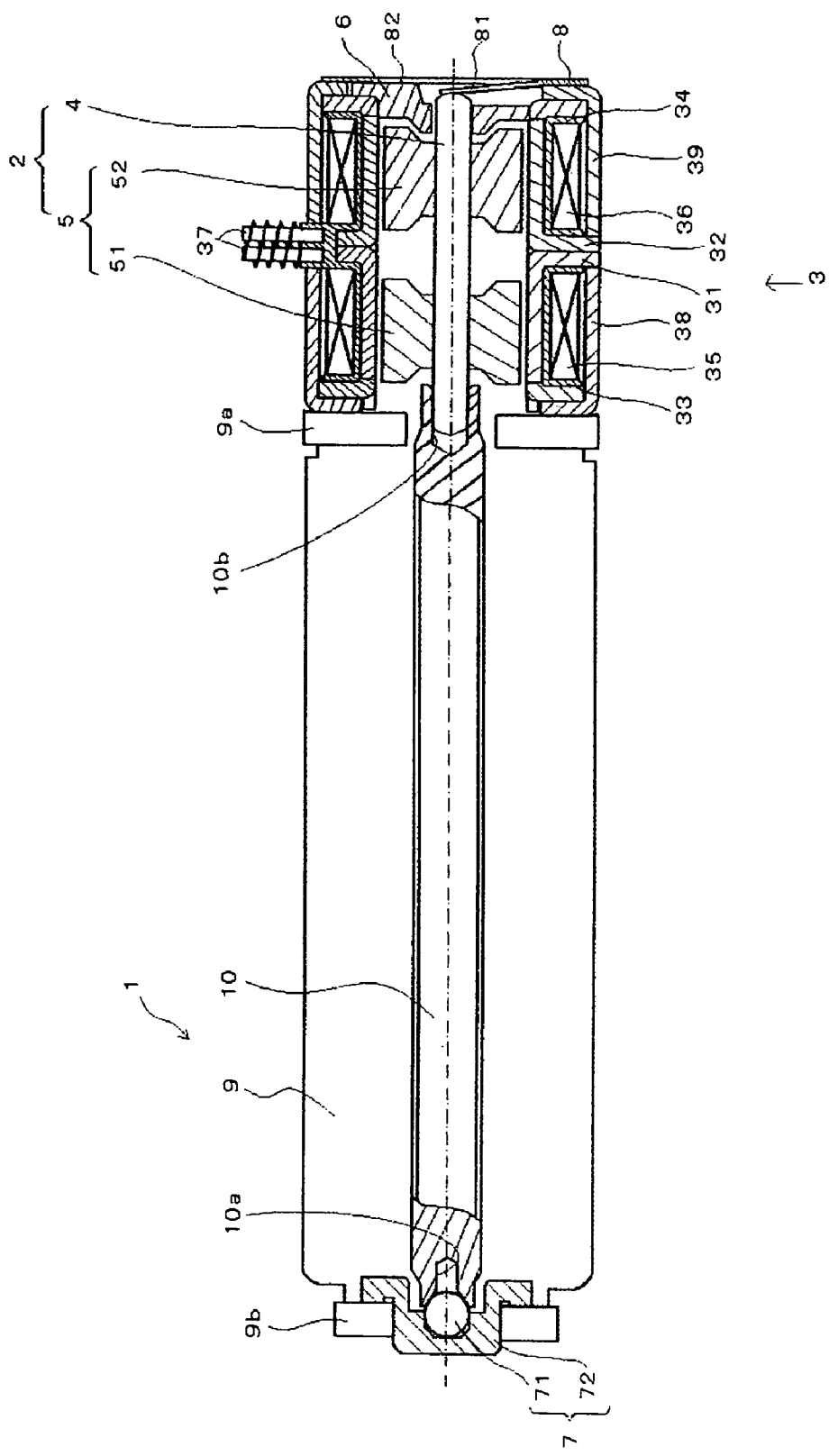
FIG. 1 is a sectional view showing a schematic structure of a motor in accordance with a first embodiment of the present invention.
Figure 2:
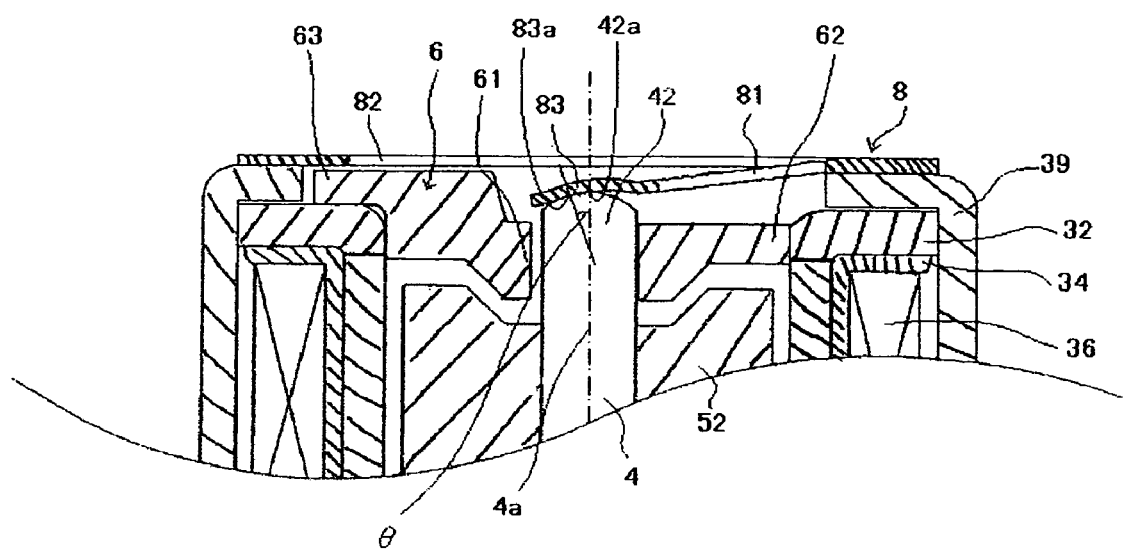
FIG. 2 is an enlarged view showing a rotor shaft side restricted part and a spring member side restricting part in accordance with the first embodiment of the present invention.

A motor in accordance with an embodiment of the present invention will be described below with reference to the accompanying drawings. FIG. 1 is a sectional view showing a schematic structure of a motor in accordance with a first embodiment of the present invention. FIG. 2 is an enlarged view showing a rotor shaft side restricted part and a spring member side restricting part in accordance with the first embodiment of the present invention.

A motor 1 in accordance with the first embodiment of the present invention shown in FIG. 1 includes a rotor part 2 having a rotor shaft 4 and a rotor magnet 5 and a stator part 3 which is oppositely disposed so as to face the rotor magnet 5 through a clearance. The rotor shaft 4 is rotatably supported by bearings 6 and 7 and urged by a spring member 8 that abuts with one end of the rotor shaft 4 in an axial direction.

The rotor magnet 5 is fixed to the rotor shaft 4 constructing the rotor part 2 with an adhesive. The rotor magnet 5 is comprised of two pieces of approximately cylindrical permanent magnets 51, 52. In the first embodiment of the present invention, the two pieces of permanent magnets 51, 52 are formed, for example, of a rare earth permanent magnet of Nd—Fe—B system.

A recess in a circular shape is formed on both end faces of the permanent magnets 51, 52 in the axial direction. This recess makes the weight of the permanent magnets 51, 52 lighter in weight. The moment of inertia of the rotor magnet 5 is reduced by means of being light weighted as described above.

The other end of the rotor shaft 4 is fixed by press fitting or with an adhesive to a fitting hole 10b of a shaft 10 on which a lead screw part is formed. The lead screw part is engaged with a body to be fed not shown in the drawing.

The stator part 3 is constructed in a two-phase structure by using a first stator core 31 and a second stator core 32 which is adjacently fixed to the first stator core 31 in the axial direction. Each of the first and the second stator cores 31, 32 is structured such that a plurality of pole teeth of the first or the second stator cores 31, 32 are alternately disposed.

Circular ring-shaped coil bobbins 33, 34 are respectively disposed on the outer peripheral faces of the respective pole teeth in the first and the second stator cores 31, 32. Coils 35, 36 are wound around the body part of the circular ring-shaped coil bobbins 33, 34 and the terminals of the coils 35, 36 are connected to terminal pins 37 that are integrally provided in the coil bobbins 33, 34.

The first stator core 31 is housed in a motor case 38 and the second stator core 32 is similarly housed in a motor case 39. The first and the second stator cores 31, 32 and the motor cases 38, 39 are concentrically disposed on the axial line of the rotor shaft 4 as shown in FIG. 1 and fixed by welding.

The motor case 38 is fixed by welding to an erected part 9a which is formed in a frame 9 as shown in FIG. 1. An erected part 9b is also formed in the frame 9 and the bearing 7 is press-fitted to the erected part 9b for rotatably supporting the shaft 10 on which the lead screw part is formed.

The bearing 7 includes a ball 71 abutting with a fitting hole 10a formed at the tip end of the shaft 10 and a ball holding body 72 which holds the ball 71.

The bearing 6 is formed of resin having a lubricating property and rotatably supports one end of the rotor shaft 4 in the radial direction. As shown in FIG. 2, bearing 6 for supporting the rotor shaft 4 in the radial direction (hereinafter, referred to as "radial bearing 6") is formed with a bearing part 61 for supporting the rotor shaft 4 to be inserted, a press fitting part 62 which is press-fitted and fixed to the inner diameter face of the second stator core 32, and a flange part 63 which is formed with one part of the outer peripheral part of the bearing 6 being protruded in the radial direction. The bearing part 61 is disposed so as to be positioned in a recessed part which is formed on the rotor magnet 5 to reduce the dimension of the entire motor 1 in the axial direction. In addition, the size of the inner diameter of the bearing part 61 is set to form a clearance with respect to the outer diameter of the rotor shaft 4. The flange part 63 is placed on the second stator core 32 to perform the positioning of the bearing 6 in the axial direction.

The spring member 8 is formed from one piece of a metal plate and includes a spring part 81 abutting with one end of the rotor shaft 4 and a center hole 82. Further, the spring member 8 is fixed at a prescribed position of the motor case 39 by welding.

The spring part 81 abuts with the one end of the rotor shaft 4 at a position deviated from the shaft center line 4a of the rotor shaft 4 as shown in FIG. 2. In other words, the spring part 81 urges the rotor shaft 4 in the axial direction and in the radial direction such that a part of the outer peripheral face of the rotor shaft 4 is brought into contact with the inner peripheral face of a part of the bearing part 61 of the radial bearing 6. For example, in the first embodiment of the present invention, the spring part 81 abuts with the rotor shaft 4 at a position of about angle θ=20° deviated from the shaft center line 4a in the radial direction. However, the present invention is not limited to the angle θ=20°. According to the construction described above, since the rotor shaft 4 is urged by a spring in the radial direction, the fluctuation of the rotor shaft 4 is regulated in the contacting direction and the vibration is restrained, and thus the occurrence of striking noise is restrained.

Next, the regulation of the fluctuation of the rotor shaft 4 in the radial direction by the rotor shaft side restricted part 42 and the spring member side restricting part 83 will be described below with reference to FIG. 2.

The rotor shaft side restricted part 42 is a spherical protruded part formed at the one end of the rotor shaft 4. The spring member side restricting part 83 is a spherical recessed part formed on the tip end side of the spring part 81. The center of the spherical protruded part of the rotor shaft side restricted part 42 coincides with the shaft center line 4a of the rotor shaft 4. In addition, the diameter of the spherical recessed part of the spring member side restricting part 83 is set to be larger than that of the spherical protruded part of the rotor shaft side restricted part 42. In other words, the abutting area is set to become a point contact and a line contact to reduce their contacting area and thus a sliding loss and a sliding noise are restrained.

In the first embodiment of the present invention, the rotor shaft side restricted part 42 and the spring member side restricting part 83 are respectively formed in a spherical protruded part and in a spherical recessed part. This construction serves as an aligning function in which their respective axial centers are shifted so as to coincide with each other. Therefore, even when the rotor shaft side restricted part 42 fluctuates, the position (area) where the spherical protruded part of the rotor shaft side restricted part 42 abuts with the spherical recessed part of the spring member side restricting part 83 can converge to near the bottom part of the spherical recessed part.

In addition, the rotor shaft side restricted part 42 is worked to become the spherical protruded part by using barrel polishing, and the spring member side restricting part 83 is formed such that the spherical recessed part is formed on the spring part 81 by only using a punch or the like. Therefore, both the restricted part 42 and the restricting part 83 can be formed without using additional component parts and, as described above, both the restricted part 42 and the restricting part 83 can be simply worked without requiring a special tool and can be formed at a low cost. The working for the spherical protruded part of the rotor shaft side restricted part 42 and the working for the spherical recessed part of spring member side restricting part 83 are not limited to the above-mentioned working method.

The motor 1 structured as described above is rotated such that the rotor magnet 5 (permanent magnet 51, 52) is rotatably urged due to the magnetic interaction between the stator part 3 and the rotor magnet 5 (permanent magnet 51, 52) by applying a prescribed electric current to the coils 35, 36 of the stator part 3, and the rotor shaft 4 fixed to the rotor magnet 5 is rotated. Further, in the first embodiment of the present invention, when the rotor shaft 4 is rotated, the lead screw part of the shaft 10 provided at the one end of the rotor shaft 4 is rotated in an integral manner to move a body to be fed (not shown in the drawing) in the axial direction which is engaged with the lead screw part. The operation of the motor 1 and the body to be fed by the motor 1 is similar to that of a conventional well-known motor and the like, and thus detailed description is omitted.

When the motor is rotated, the fluctuation of the rotor shaft 4 may occur due to the positioning errors or the like between the rotor magnet 5 (permanent magnets 51, 52) and the stator part 3, and the above-mentioned striking noise and sliding noise may occur between the rotor shaft 4 and the radial bearing 6, the bearing 7 or the like.

However, in the motor 1 in accordance with the first embodiment of the present invention, the spring part 81 abuts with the one end of the rotor shaft 4 to urge the rotor shaft 4 in the axial direction and the radial direction. In addition, the spring part 81 is provided with the rotor shaft side restricted part 42 formed in the spherical protruded part and the spring member side restricting part 83 formed in the spherical recessed part which holds the rotor shaft side restricted part 42. Therefore, even when the rotor shaft 4 is fluctuated in the radial direction, the fluctuation of the rotor shaft 4 in the radial direction is regulated by the spring part 81 or by both the rotor shaft side restricted part 42 and the spring member side restricting part 83, and thus the vibration is restrained and the occurrence of striking noise is restrained.

Further, in the first embodiment of the present invention, the rotor shaft side restricted part 42 and the spring member side restricting part 83 are formed in the spherical protruded part and in the spherical recessed part which holds the spherical protruded part. Therefore, like an example that, when a ball is rolled along the circumferential surface of a hemispheric receptacle, the ball is finally moved to the bottom of the hemispheric receptacle, this means a type of aligning function in which the respective axial centers are automatically aligned with each other. Therefore, the position (area) where the spherical protruded part of the rotor shaft side restricted part 42 abuts with of the spherical recessed part of the spring member side restricting part 83 converges to near the bottom of the spherical recessed part of the spring member side restricting part 83.

The motor 1 in accordance with the first embodiment of the present invention is provided with the rotor shaft side restricted part 42 formed in the spherical protruded part at the one end of the rotor shaft 4 and the spring member side restricting part 83 formed in the spherical recessed part for holding the spherical protruded part of the rotor shaft side restricted part 42. Therefore, even when the rotor shaft 4 is fluctuated in the radial direction, the fluctuation of the rotor shaft 4 in the radial direction is regulated by both the rotor shaft side restricted part 42 and the spring member side restricting part 83, and thus the vibration can be restrained and the occurrence of striking noise can be restrained.

Further, in the first embodiment of the present invention, the rotor shaft side restricted part 42 and the spring member side restricting part 83 are respectively formed in the spherical protruded part and in the spherical recessed part, which serves as an aligning function in which their respective axial centers are aligned so as to coincide with each other. Therefore, even when the rotor shaft side restricted part 42 is fluctuated, the position (area) where the spherical protruded part of the rotor shaft side restricted part 42 abuts with the spherical recessed part of the spring member side restricting part 83 can be converged to near the bottom part of the spherical recessed part. Accordingly, the vibration and the occurrence of striking noise can be restrained.

In addition, the rotor shaft side restricted part 42 is worked to be the spherical protruded part by using barrel polishing, and the spring member side restricting part 83 is formed such that the spherical recessed part is formed on the spring part 81 by using a punch or the like. Therefore, both the restricted part 42 and the restricting part 83 can be formed without using additional component parts and, as described above, both the restricted part 42 and the restricting part 83 can be simply worked without requiring a special tool and can be formed at a low cost.

Further, the spring part 81 of the spring member 8 urges a part of the outer peripheral face of the rotor shaft 4 to bring into contact with a part of the inner peripheral face of the bearing part 61 of the radial bearing 6. Therefore, since the rotor shaft 4 is urged by the spring in the radial direction, the fluctuation of the rotor shaft 4 is regulated in the contacting direction, and thus the vibration is restrained and the occurrence of striking noise is restrained.

The results of the noise evaluations of a motor in accordance with the first embodiment of the present invention and a conventional motor when the respective motors are rotated are as follows. These motors are used for a video camera or a digital camera.

1) a motor in accordance with the first embodiment of the present invention . . . 28–30 dB-A.

The sound of "rattling" peculiar to the striking noise is not generated.

2) a conventional motor . . . 34–37 dB-A.

The sound of "rattling" particular to the striking noise is generated. As described above, in the motor in the first embodiment of the present invention, the occurrence of the striking noise is restricted and noises during rotation are reduced in comparison with the conventional motor.

The motor in accordance with the first embodiment of the present invention is provided with the rotor shaft side restricted part and the spring member side restricting part. Therefore, the contact (sliding) area is increased in comparison with the structure of the conventional motor, and thus the sliding noises may increase to some extent. However, according to the motor in accordance with the first embodiment of the present invention, the occurrence of striking noise is restrained and, as a result, noises during rotation are reduced in comparison with the conventional motor.

The present invention has been described in detail using this embodiment, but the present invention is not limited to the embodiment described above and many modifications can be without departing from the present invention.

Figure 6:
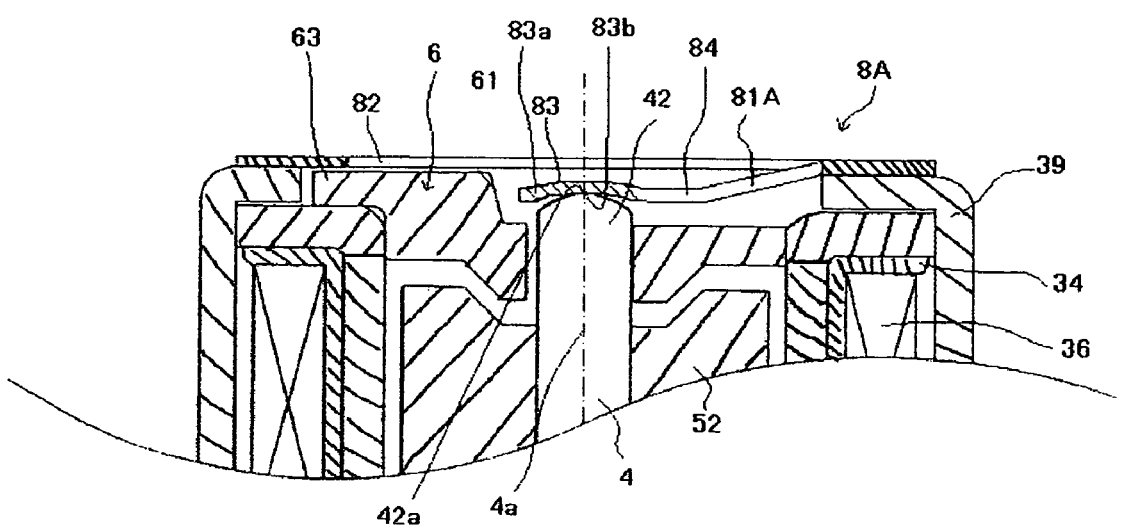
FIG. 6 is an enlarged view showing a rotor shaft side restricted part and a spring member side restricting part in accordance with a second embodiment of the present invention.

Next, a motor in accordance with a second embodiment of the present invention will be described with reference to FIG. 6, in which a rotor shaft side restricted part 42 and a spring member side restricting part 83 are provided to regulate the fluctuation of the rotor shaft 4 in the radial direction. FIG. 6 is an enlarged view showing the rotor shaft side restricted part 42 and the spring member side restricting part 83 in accordance with the second embodiment of the present invention. In the second embodiment of the present invention, the same notational symbols are used for the same constructing members as the first embodiment and their description is omitted.

A spring member 8A shown in the second embodiment of the present invention is formed of one piece of a metal plate similarly to the spring member 8 shown in the first embodiment and fixed at a prescribed position of the motor case 39 by welding. A spring part 81A for abutting with one end of the rotor shaft 4 is formed in the spring member 8A so as to extend on the inner side from the center hole 82. The difference between the second embodiment from the first embodiment is that the spring part 81A is provided with a bent part 84 for adjusting the position of the spring member side restricting part 83 abutting on the shaft center line 4a of the rotor shaft 4 (rotor shaft side restricted part 42).

The bent part 84 is formed at a position near the spring member side restricting part 83 of the spring part 81A so as to be substantially parallel to the direction perpendicular to the shaft center line 4a of the rotor shaft 4. According to the construction described above, the spring member side restricting part 83 formed in the spherical recessed part can be arranged such that the center 83b of the spherical recessed part is positioned at the center 42a of the rotor shaft side restricted part 42, i.e., on the shaft center line 4a of the rotor shaft 4. The spring member side restricting part 83 of the spring part 81A urges the rotor shaft side restricted part 42 in the axial direction of the rotor shaft 4 as shown in FIG. 6. In the second embodiment of the present invention, similarly to the first embodiment, the diameter of the spherical recessed part of the spring member side restricting part 83 is set to be larger than that of the spherical protruded part of the rotor shaft side restricted part 42. Therefore, the center 42a of the spherical protruded part of the rotor shaft side restricted part 42 is capable of abutting with the center 83b of the spherical recessed part of the spring member side restricting part 83.

The spring member 8A in accordance with the second embodiment of the present invention is formed by press working, which is punching the raw material of a thin plate. At this time, a bending process is simultaneously applied to the spring part 81A to form the bent part 84. The bent part

84 is formed by the bending process with a high degree of accuracy. If required, at the time of assembling or the like, the bent part 84 may be adjusted such that the spring member side restricting part 83 abuts on the shaft center line 4*a* of the rotor shaft 4 (rotor shaft side restricted part 42). Further, in the second embodiment of the present invention, the center 83*b* of the spherical recessed part of the spring member side restricting part 83 is formed so as to coincide with the center 42*a* of the rotor shaft side restricted part 42, i.e., the shaft center line 4*a* of the rotor shaft 4. However, the present invention is not to be limited to the second embodiment. Concretely, judging from the starting torque, similar effects may be obtained even when the center 83*b* of the spherical recessed part of the spring member side restricting part 83 abuts with the rotor shaft side restricted part 42 at a position deviated to about 10° from the shaft center line 4*a* of the rotor shaft 4.

The motor in accordance with the second embodiment of the present invention is also constructed, similarly to the motor 1 in the first embodiment, such that the spring part 81 abuts with one end of the rotor shaft 4 to urge the rotor shaft 4 in the axial direction. In addition, the motor in accordance with the second embodiment is provided with the rotor shaft side restricted part 42 formed in the spherical protruded part and the spring member side restricting part 83 formed in the spherical recessed part which holds the rotor shaft side restricted part 42. Therefore, even when the rotor shaft 4 is fluctuated in the radial direction, the fluctuation of the rotor shaft 4 in the radial direction is regulated by the spring part 81A or both the restricted part 42 and the restricting part 83. Accordingly, the vibration and the occurrence of the striking noise are restrained.

In addition, in the second embodiment of the present invention, the spring member side restricting part 83 urges the rotor shaft side restricted part 42 in the axial direction of the rotor shaft 4. In other words, the spring member side restricting part 83 formed in the spherical recessed part is disposed such that the center 83*b* of the spherical recessed part of the spring member side restricting part 83 conincides with the center 42*a* of the rotor shaft side restricted part 42, i.e., the shaft center line 4*a* of the rotation shaft 4. Therefore, the length from the shaft center line 4*a* of the rotor shaft 4 in the radial direction becomes smaller than that in the first embodiment of the present invention. Accordingly, the occurrence of the striking noise is restrained and the occurrence of an excessive load torque can be restrained at the time of starting.

In other words, as described above, in the first embodiment of the present invention, the spring member side restricting part 83 abuts with the rotor shaft side restricted part 42 at the position deviated from the center of the rotor shaft 4. Therefore, when the motor 1 is started, a torque is generated which is proportional to the distance in the radial direction from the shaft center line 4*a* to the abutting position of the rotor shaft 4. In addition, the rotor shaft 4 slides on the bearing part 61 of the radial bearing 6 and the frictional resistance is generated, which causes a load torque at the time of staring of the motor. Accordingly, the motor 1 in the first embodiment of the present invention requires a higher torque to start than the starting torque that is required to merely rotate the rotor shaft 4.

On the other hand, in the motor in accordance with the second embodiment of the present invention, since the spring member side restricting part 83 urges the rotor shaft side restricted part 42 in the axial direction of the rotor shaft 4, the spring member side restricting part 83 abuts with the rotor shaft side restricted part 42 at the center position (shaft center line 4*a*) of or near the rotor shaft 4. Therefore, the load torque described above can be reduced and the starting torque required to start rotating at the time of stoppage can be reduced and thus the starting performance of the motor can be improved. For example, in the motor of the second embodiment, the starting voltage at the time of staring is reduced to 1.3 V from 1.6 V. In addition, since the bent part 84 is formed by press working, the bent part 84 can be simply worked without adding a separate component part and thus can be formed at a low cost. Further, if needed, since the bent part 84 can be adjusted such that the spring member side restricting part 83 abuts with the rotor shaft side restricted part 42, simple adjustment can be obtained.

The bent part 84 is formed by bending in a press working process but the present invention is not limited to this method. For example, the bent part may be formed in a curved shape at the time of press working. The important matter is that the center part 83*b* of the spring member side restricting part 83 abuts with the center 42*a* of the rotor shaft side restricted part 42 and the spring member side restricting part 83 is adjusted so as to urge the rotor shaft 4 in the axial direction.

Further, in the second embodiment of the present invention, the bent part 84 is formed in the spring part 8A and the spring member side restricting part 83 urges the rotor shaft side restricted part 42 in the axial direction of the rotor shaft 4. However, alternatively, the bent part 84 may not be provided in the spring part 8A, the rotor shaft 4 is extended in the axial direction and the spring member side restricting part 83 urges the rotor shaft side restricted part 42 in the axial direction of the rotor shaft 4.

Figure 3:
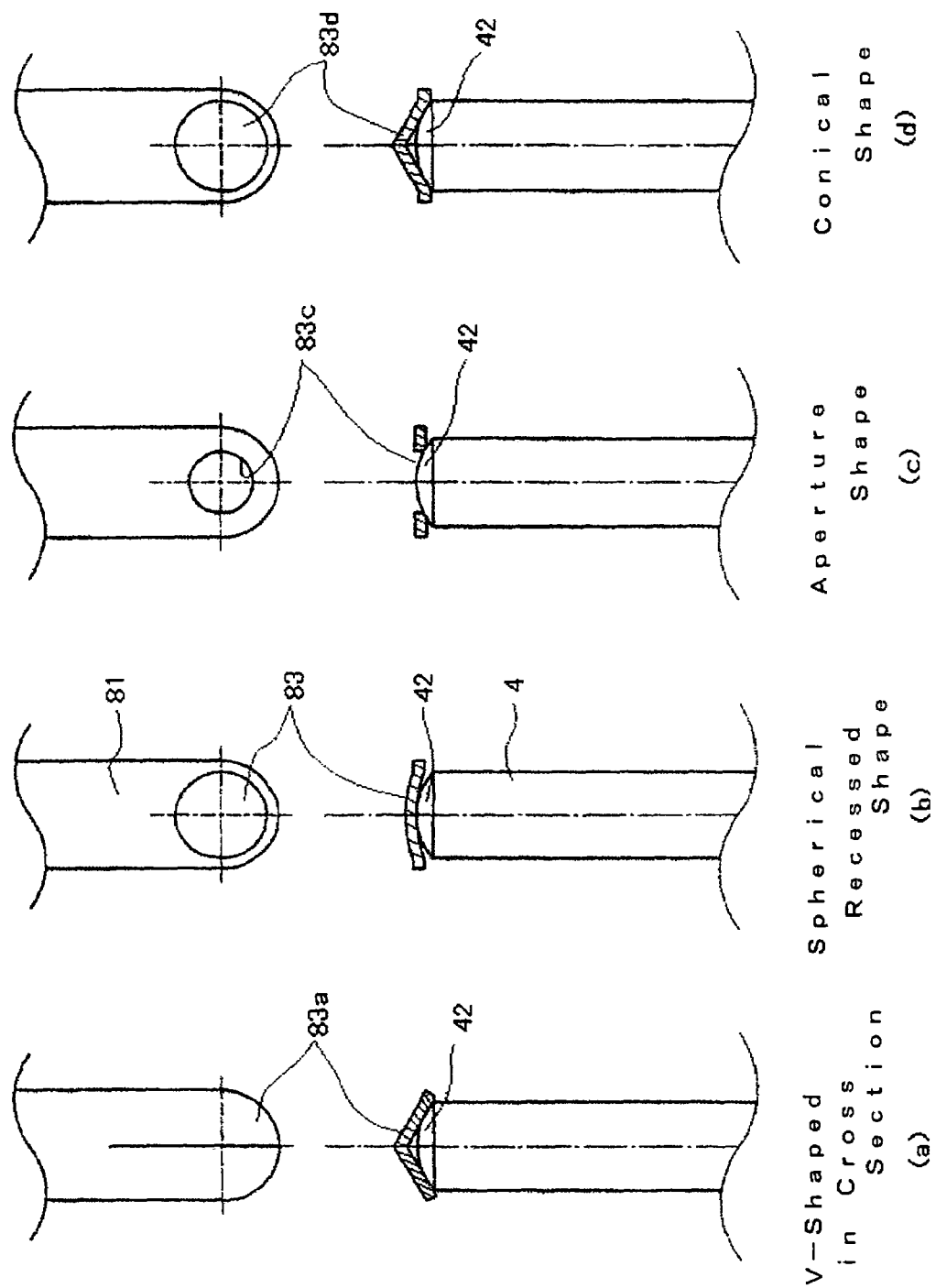
FIGS. 3(a) through 3(d) are enlarged views showing a rotor shaft side restricted part and a spring member side restricting part in accordance with other embodiments of the present invention.
Figure 4:
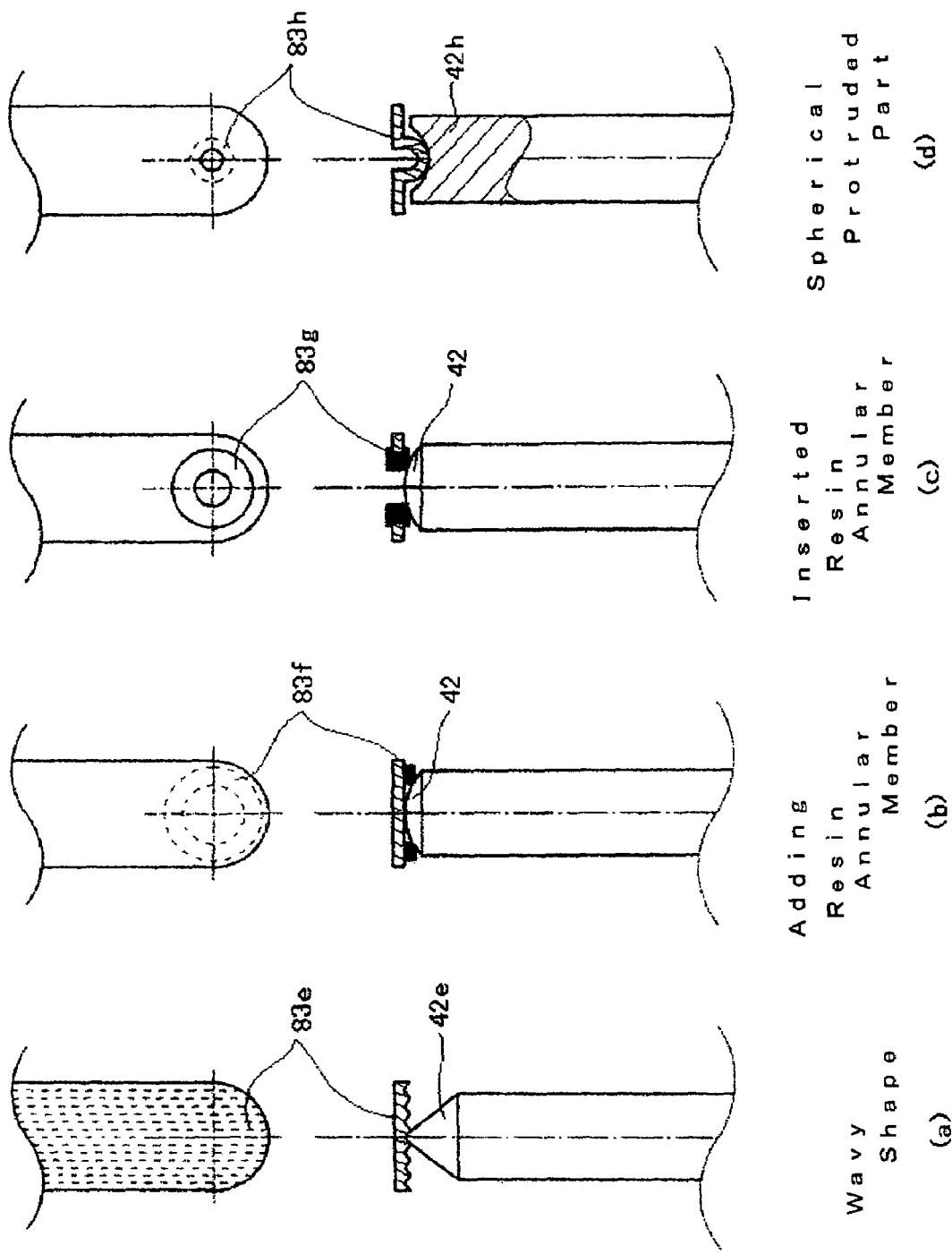
FIGS. 4(a) through 4(d) are enlarged views showing a rotor shaft side restricted part and a spring member side restricting part in accordance with other embodiments of the present invention.
Figure 5:
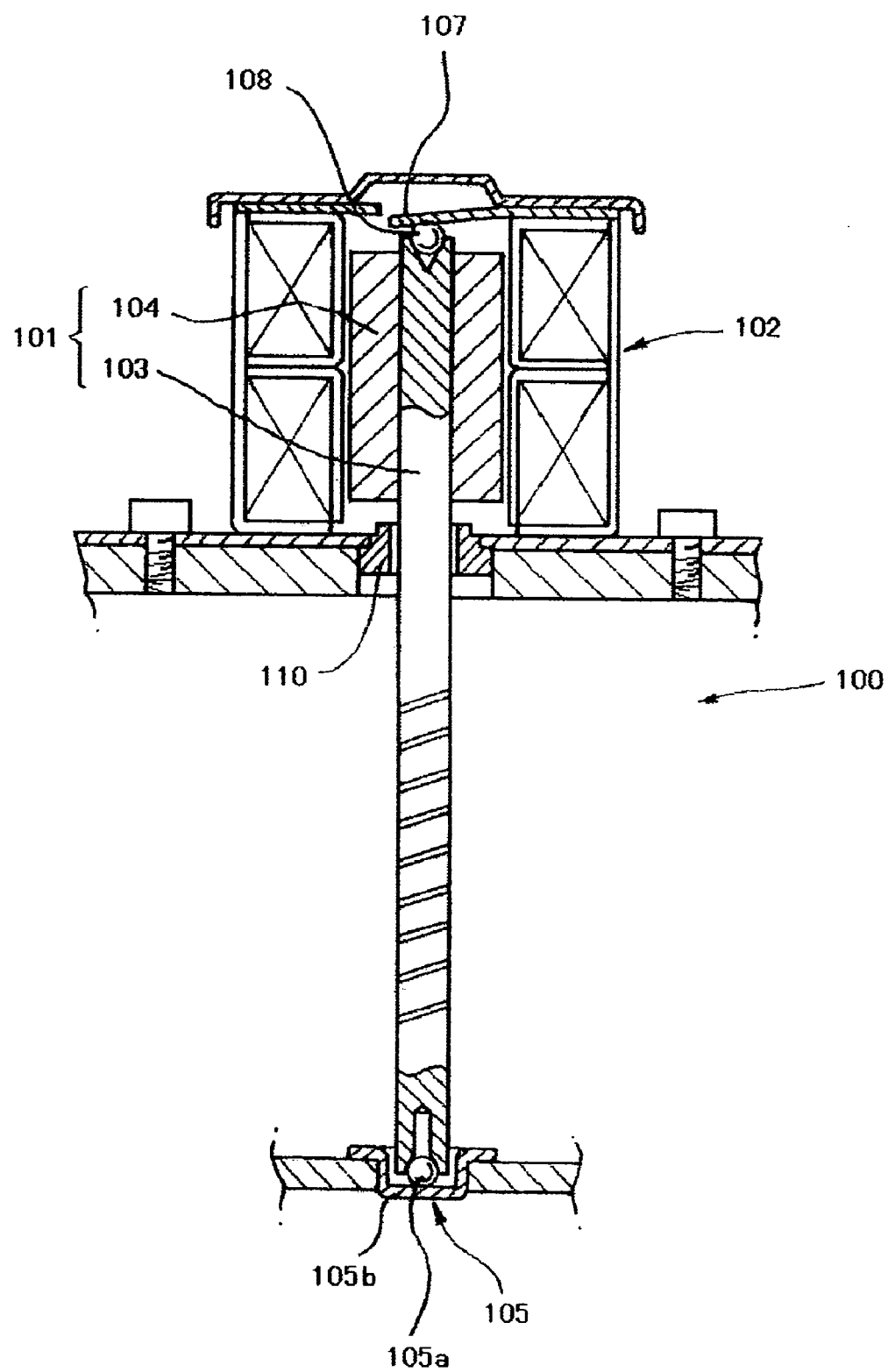
FIG. 5 is a sectional view showing a schematic structure of a conventional motor.

FIGS. 3(*a*) through 3(*d*) are enlarged views showing the rotor shaft side restricted part and the spring member side restricting part in accordance with other embodiments of the present invention. FIGS. 4(*a*) through 4(*d*) are enlarged views showing the rotor shaft side restricted part and the spring member side restricting part in accordance with other embodiments of the present invention. FIGS. 3(*a*) through 3(*d*) and FIGS. 4(*a*) through 4(*d*) are each different directional views from that in FIG. 2.

In FIG. 3(*a*), the rotor shaft side restricted part 42*a* is formed in a spherical shape and the spring member side restricting part 83*a* is formed in a V-shape in a cross-sectional view. According to the structure described above, the fluctuation of the rotor shaft 4 can be regulated in the radial direction different from the radial direction urged by the spring part 83*a*. The spring member side restricting part 83*a* in accordance with the embodiment of the present invention can be formed by only bending a spring part made of a flat plate in the V-shape in the cross-sectional view. Therefore, the spring member side restricting part 83*a* can be simply and easily worked without requiring a special tool.

FIG. 3(*b*) is a view in which the rotor shaft side restricted part 42*b* is formed in a spherical shape and the spring member side restricting part 83*a* is formed in a spherical recessed part. The embodiment shown in FIG. 3(*b*) is similar to the above-mentioned embodiment and thus its description is omitted.

FIG. 3(*c*) is a view in which the rotor shaft side restricted part 42*c* is formed in a spherical shape and the spring member side restricting part 83*c* is formed in an aperture part having a smaller diameter than the outer diameter of the rotor shaft side restricted part 42*c*. Therefore, the aperture part of the spring member side restricting part 83*c* regulates the outer diameter portion of the spherical rotor shaft side restricted part 42*c*. According to the structure described above, the spring member side restricting part 83*c* can be formed to be substantially the same height without protruding from the spherical center part of the rotor shaft side restricted part 42c. Therefore, the spring member side restricting part 83c does not protrude in the axial direction and thus the motor can be made thinner.

In FIG. 3(*d*), the rotor shaft side restricted part 42d is formed in a spherical shape and the spring member side restricting part 83d is formed in a conical shape. Therefore, the spring member side restricting part 83d abuts with the rotor shaft side restricted part 42d in a face contact manner and thus the holding performance of the rotation shaft can be further satisfactorily maintained.

In FIG. 4(*a*), the rotor shaft side restricted part 42e is formed in a generally conical shape having a spherical tip end part and the spring member side restricting part 83e is formed in a recesses-projections surface in a wavy shape for holding the spherical tip end part of the rotor shaft side restricted part 42e. Therefore, the spring member side restricting part 83e is engaged with the tip end of the rotor shaft side restricted part 42e at a concaved face part, and thus the rotor shaft side restricted part 42e can be easily held and the positioning of the rotor shaft side restricted part 42e can be easily performed.

In FIG. 4(*b*), the rotor shaft side restricted part 42f is formed in a spherical shape and the spring member side restricting part 83f is formed such that an annular member made of resin is fixed on a thin plate member. The inner diameter of the aperture of the resin annular member is set to be smaller than the outer diameter of the rotor shaft side restricted part 42f. Thus, the spring member side restricting part 83f holds the rotor shaft side restricted part 42f such that the aperture part of the resin annular member regulates the outer diameter part of the spherical rotor shaft side restricted part 42f similarly to the embodiment shown in FIG. 3(*c*). The spring member side restricting part 83f is formed to be substantially the same height as the rotor shaft side restricted part 42f without protruding from the spherical center part of the rotor shaft side restricted part 42f. Therefore, since an increase in the thickness of the spring member side restricting part 83f is not required, thus the motor can be thinner. In addition, since the resin annular member is adhered to the abutting portion with the rotor shaft side restricted part 42f, the metal and the resin are abutted with each other and thus durability is excellent, which is different from the case of abutting with metal and metal like the above-mentioned embodiments.

FIG. 4(*c*) is a view showing an improved embodiment of that in FIG. 4 (*b*). In FIG. 4(*c*), the rotor shaft side restricted part 42g is formed in a spherical shape and the spring member side restricting part 83g is formed such that a resin annular member is insert-molded in a thin plate member. Also in this case, the spring member side restricting part 83g can be formed thinner and excellent in durability similarly to the spring member side restricting part 83f in FIG. 4(*b*). In addition, the spring member side restricting part 83g can be securely and easily formed by insert-molding the resin annular member to the thin plate member.

In FIG. 4(*d*), a spherical recessed part is formed as the rotor shaft side restricted part 42h and a spherical shaped protruded part is formed as the spring member side restricting part 83h. The diameter of the spherical shaped protruded part 83h is formed to be smaller than the inner diameter of the spherical recessed part 83h as the rotor shaft side restricted part 42h similarly to the above-mentioned embodiments. The rotor shaft side restricted part 42h is formed such that the center part of the rotor shaft side restricted part 42h is provided with a spherical concaved shape and the spherical protruded part 83h is inserted and supported by the spherical concaved portion. Therefore, the space for the spring member side restricting part 83h can be reduced and the motor can be thinner.

The present invention is not limited to the embodiments shown in FIGS. 3(*a*) through 3(*d*) and FIGS. 4(*a*) through 4(*d*), and any shape which is capable of regulating the fluctuation of the rotation shaft 4 can be applicable.

Further, the sliding loss may be reduced by applying a wearing resistance film, for example, performing fluorine coating at the area where the rotor shaft side restricted part 42 and the spring member side restricting part 83 are brought into contact with each other. In addition, the embodiments shown in FIGS. 3(*a*) through 3(*d*) and FIGS. 4(*a*) through 4(*d*) may be applied to the motor shown in the second embodiment of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor part having a rotor shaft and a rotor magnet;
   a stator part which is oppositely disposed to the rotor magnet via a gap space;
   a bearing which rotatably supports the rotor shaft;
   a spring member having a spring part having a bent part and a spring member side restricting part; and
   a rotor shaft side restricted part which is provided in the rotor shaft and engages with the spring member side restricting part,
   wherein the spring member abuts with one end of the rotor shaft to urge the rotor shaft in an axial direction,
   wherein a spring member side restricting part prevents fluctuating in a radial direction of the rotor shaft
   wherein the bent part is formed in proximity to the spring member side restricting part of the spring part in a direction perpendicular to an axial direction of the rotor shaft for adjusting a position of the spring member side restricting part abutting with the rotor shaft side restricted part and,
   wherein the spring member side restricting part abuts with the rotor shaft side restricted part to urge the rotor shaft in the axial direction and to prevent fluctuation in a radial direction of the rotor shaft.

2. The motor according to claim 1, wherein the spring member side restricting part is formed by spherical recessed part and the rotor shaft side restricted part is formed by a spherical protruded part.

3. The motor according to claim 1, wherein a diameter of the spherical recessed part of the spring member side restricting part is set to be larger than a diameter of the spherical protruded part of the rotor shaft side restricted part.

\* \* \* \* \*